United States Patent
Länsiö et al.

(10) Patent No.: US 7,426,211 B2
(45) Date of Patent: Sep. 16, 2008

(54) DATA TRANSMISSION METHOD AND DATA TRANSMISSION ARRANGEMENT

(75) Inventors: Jari Länsiö, Tampere (FI); Lauri Piikivi, Oulu (FI)

(73) Assignee: Nokia Corporation, Espoo (FI)

( * ) Notice: Subject to any disclaimer, the term of this patent is extended or adjusted under 35 U.S.C. 154(b) by 1058 days.

(21) Appl. No.: 10/162,148

(22) Filed: Jun. 3, 2002

(65) Prior Publication Data

US 2003/0008640 A1 Jan. 9, 2003

(30) Foreign Application Priority Data

Jun. 12, 2001 (FI) .................................. 20011237

(51) Int. Cl.
*H04J 3/22* (2006.01)

(52) U.S. Cl. .................. 370/401; 370/465; 379/100.13; 455/415; 709/203

(58) Field of Classification Search ................. 370/401, 370/465, 466, 467; 455/415; 709/203, 227, 709/228, 230; 379/100.13
See application file for complete search history.

(56) References Cited

U.S. PATENT DOCUMENTS

| | | | | |
|---|---|---|---|---|
| 6,269,373 B1 * | 7/2001 | Apte et al. | ..................... | 707/10 |
| 6,356,930 B2 * | 3/2002 | Garg | ......................... | 709/201 |
| 6,418,373 B1 * | 7/2002 | Omi et al. | .................... | 701/209 |
| 6,549,773 B1 * | 4/2003 | Linden et al. | ............. | 455/426.1 |
| 6,549,776 B1 * | 4/2003 | Joong | ......................... | 455/433 |
| 6,751,677 B1 * | 6/2004 | Ilnicki et al. | ................. | 719/316 |
| 6,937,731 B2 * | 8/2005 | Chiu | .......................... | 380/270 |
| 7,016,360 B1 * | 3/2006 | Dong | ........................ | 370/401 |
| 2004/0260816 A1 * | 12/2004 | Skog et al. | .................. | 709/227 |

FOREIGN PATENT DOCUMENTS

EP 0822492 A2 2/1998
WO WO 00/23879 4/2000

OTHER PUBLICATIONS

"Towards a Generic Architecture for Mobile Object-Oriented Applications", Haahr et al., 2000, Workshop on Service Portability.

* cited by examiner

*Primary Examiner*—Wing F. Chan
*Assistant Examiner*—Saba Tsegaye
(74) *Attorney, Agent, or Firm*—Perman & Green, LLP

(57) ABSTRACT

The invention relates to an arrangement for implementing data transmission between at least two devices. At least a section of a connection between at least two different devices is implemented by a wireless connection and at least some of the communication between the devices takes place as method call messages and reply messages to method calls. At least some of the messages to be transmitted include an address of the application that transmitted a message. A device behind the wireless connection includes means for transmitting a message containing the address such that the address of the application is provided with a predetermined symbol pattern. The arrangement includes an adapter to adapt the protocol used over the wireless section of the connection to the rest of the network and to replace the symbol pattern with the address of the device that transmitted the message.

20 Claims, 5 Drawing Sheets

DATA TRANSMISSION METHOD AND DATA TRANSMISSION ARRANGEMENT

FIELD OF THE INVENTION

The invention relates to a data transmission method and a data transmission arrangement wherein data is transmitted between a wireless system and another system. The invention particularly relates to systems wherein data is transmitted between sets of software in different devices.

BACKGROUND OF THE INVENTION

In designing and maintaining information systems, attention has been paid to the establishment and smooth operation of connections between different systems. Separately located systems have often been implemented using rather many different methods and incompatible hardware of different type. It has been laborious and time-consuming, if at all possible, to convert the different systems into compatible ones.

Consequently, many different hardware and system manufacturers have developed a common architecture called CORBA (Common Object Request Broker Architecture) to enable different computer systems implemented using different programming languages to communicate with each other in a flexible manner. The CORBA specifies a GIOP (General Inter-ORB Protocol) protocol, and application of this protocol enables devices of different type and programs programmed in different programming languages to communicate. The GIOP protocol is a common protocol, from which an IIOP (Internet Inter-ORB Protocol) is has been developed particularly for the Internet environment. Further information on the CORBA can be obtained e.g. from a specification called The Common Object Request Broker: Architecture And Specification., Revision 2.0, and Paragraph 2 thereof: CORBA Overview, published by OMG (Object Management Group), a group which created the architecture. The specification can also be found at www.omg.org.

The CORBA has been developed for systems that are fixedly interconnected through an unspecified network. When the protocol was being designed, little attention was paid to transmission path capacity and to the possibly changing transmission paths, the main focus being the creation of a safe and flexible protocol. Since wireless communication has recently become increasingly popular, computers and devices whose only or main connection to other networks is a wireless network, such as a GSM, GPRS or UMTS, have also started using information systems and different software.

Figure 1:
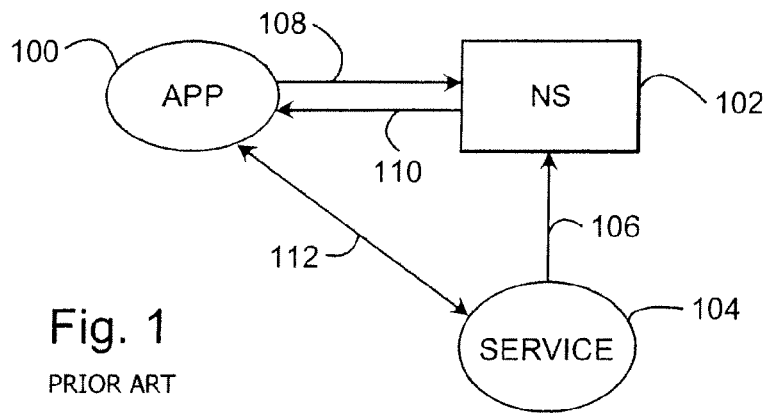

Examine a simplified example of the CORBA architecture in FIG. 1. The figure shows software or an application 100 and a name server 102. A name server is typically a server implemented by a computer and software, into which applications providing different services can register. In the example of FIG. 1, an application 104 providing a service is registered in the name server. Physically, an application is typically software arranged in computer hardware. When the application registers in the name server, it indicates its address, i.e. how the application can be accessed. The name server maintains a list of software items providing different services, including the addresses of the software items. When the software 100 needs a service, it establishes a connection 108 to the name server 102 and indicates that it needs a particular service. The name server searches its list for such a service and replies by issuing the address of the application providing the desired service. Next, the software may transmit a service request 112 to the application 104 providing the service.

A special feature of the wireless telecommunication systems, and cellular radio systems in particular, is that the applications run in the terminals of the systems do not know their own address, which would enable applications in other devices to access a particular application. This is because the terminals do not know their own number, i.e. their MSISDN (Mobile Subscriber Integrated Services Digital Network number) number. Examine a GSM system as an example; a terminal knows its own IMSI identifier, which is stored on the SIM card in the terminal. If necessary, the GSM network, in turn, is responsible for finding out the connection between the IMSI and the actual telephone number (MSISDN). However, the IMSI number cannot be used as the address of the terminal, but only the MSISDN number can be used as such.

The CORBA was originally developed for systems that did not take mobility or special features of the radio systems into account. Consequently, addresses to be attached to method calls and other communication e.g. in connection with service registration present a problem. Storing the MSISDN number of the terminals in the terminals is not necessarily a good idea since the number would no longer apply e.g. after installing a new SIM card.

BRIEF DESCRIPTION OF THE INVENTION

An object of the invention is thus to provide a method and an arrangement implementing the method so as to make using wireless devices less problematic. This is achieved by a method for implementing data transmission between applications run at least in two different devices comprising means for establishing a connection to a data transmission system, in which method at least a section of a connection between the applications run at least in two different devices is implemented by a wireless connection, and at least some of the communication between the applications takes place by transmitting method call messages and reply messages to method calls, each method call comprising a service request, and at least some of the messages to be transmitted comprise an address of the application that transmitted a message, and in which method a device behind the wireless connection transmits a message containing the address such that the address of the application contains a predetermined symbol pattern, and the message is transmitted to an adapter (500) to adapt the protocol used over the wireless section of the connection to the rest of the network and to replace the symbol pattern with the address of the device that transmitted the message.

The invention also relates to an arrangement for implementing data transmission between at least two devices, at least one of the devices comprising means for establishing a wireless connection to a data transmission system, in which arrangement at least a section of a connection between at least two different devices is implemented by a wireless connection, and in which arrangement at least some of the communication between the devices is arranged to take place by transmitting method call messages and reply messages to method calls, each method call comprising a service request, and at least some of the messages to be transmitted comprise an address of the application that transmitted a message.

In the arrangement of the invention, a device behind the wireless connection comprises means for transmitting a message containing the address such that the address of the application is provided with a predetermined symbol pattern, the arrangement comprises an adapter which is connected to wireless devices and which adapts the protocol used over the wireless section of the connection to the rest of the network, the adapter being arranged to replace the symbol pattern with the address of the device that transmitted the message.

Preferred embodiments of the invention are disclosed in the dependent claims.

The invention can be applied particularly when using the CORBA protocol in wireless telecommunication devices, but the invention can also be applied to other systems utilizing addressed messages and solutions of the name server type.

In a preferred embodiment of the invention, the application run in a device behind a wireless connection transmits a message comprising information on a service provided by the application and address information. The address of the application that transmitted the message should comprise address information on the device and the address of the memory space of the application in the memory of the device. In the preferred embodiments of the invention, the address information on the device in the message transmitted by the device is replaced with a predetermined symbol pattern.

An adapter in the arrangement receives the message comprising the predetermined symbol pattern, finds out, from the telecommunication system, the address information (MSISDN number) on the device that transmitted the message, and replaces the predetermined symbol pattern with this number. The adapter forwards the message to a name server, which maintains a list of software items providing different services.

The method and arrangement of the preferred embodiments of the invention provide several advantages. The invention enables the devices in cellular radio systems to use the CORBA protocol and other such protocols and to provide services using these protocols without problems.

BRIEF DESCRIPTION OF THE INVENTION

Figure 4:
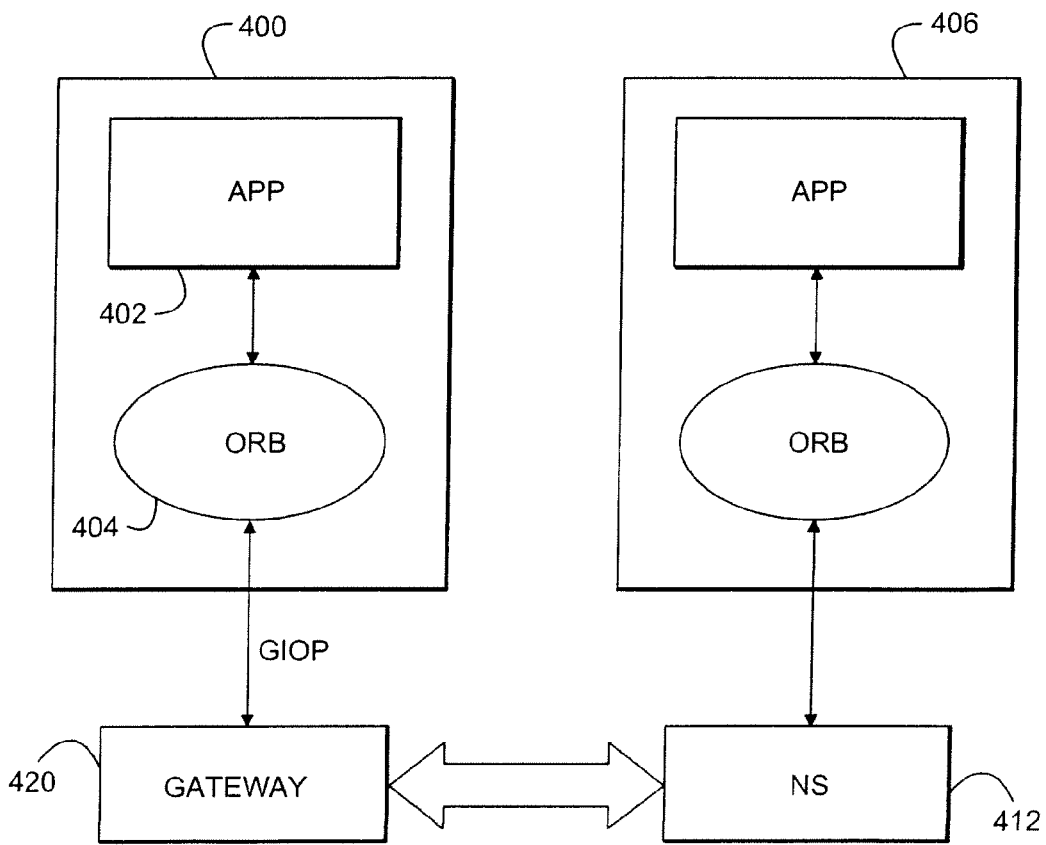
Figure 2:
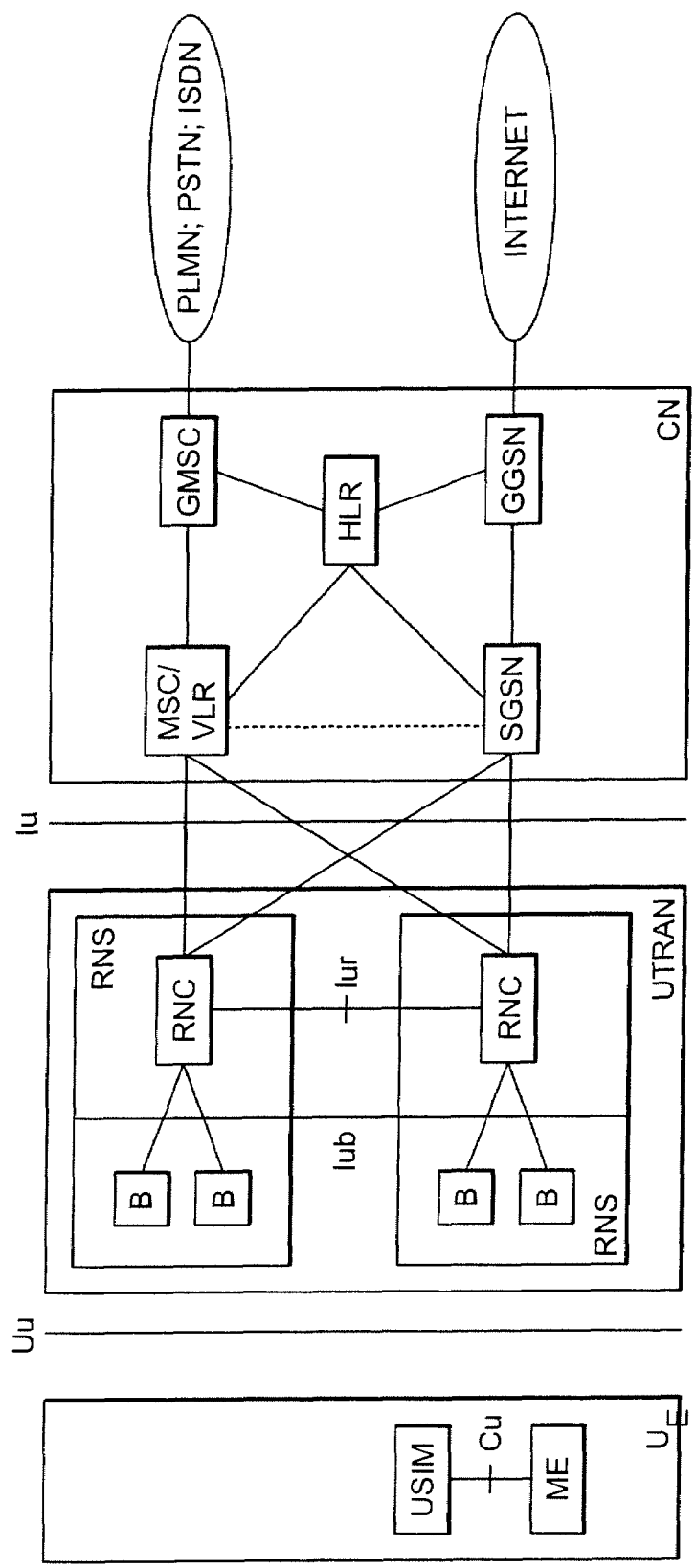
Figure 3:
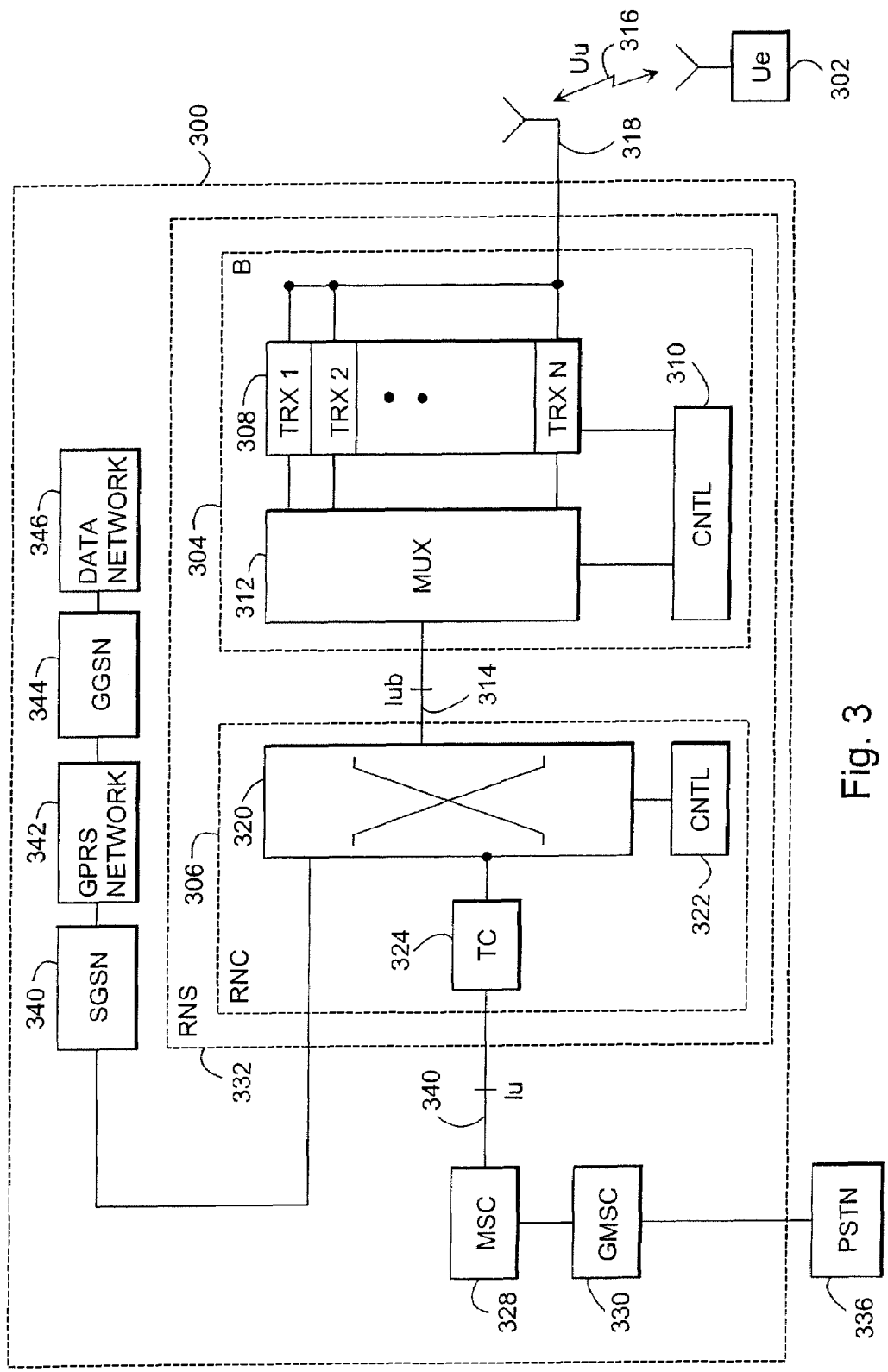
Figure 5:
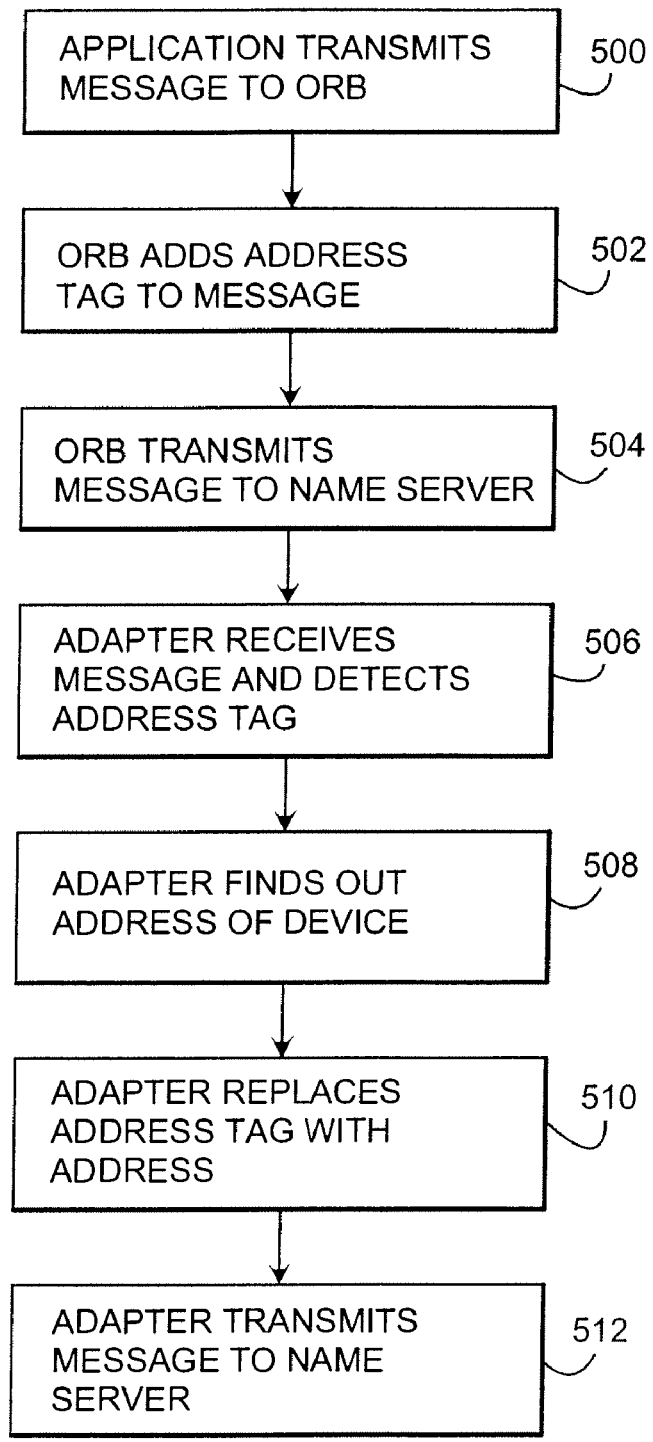
Figure 6:
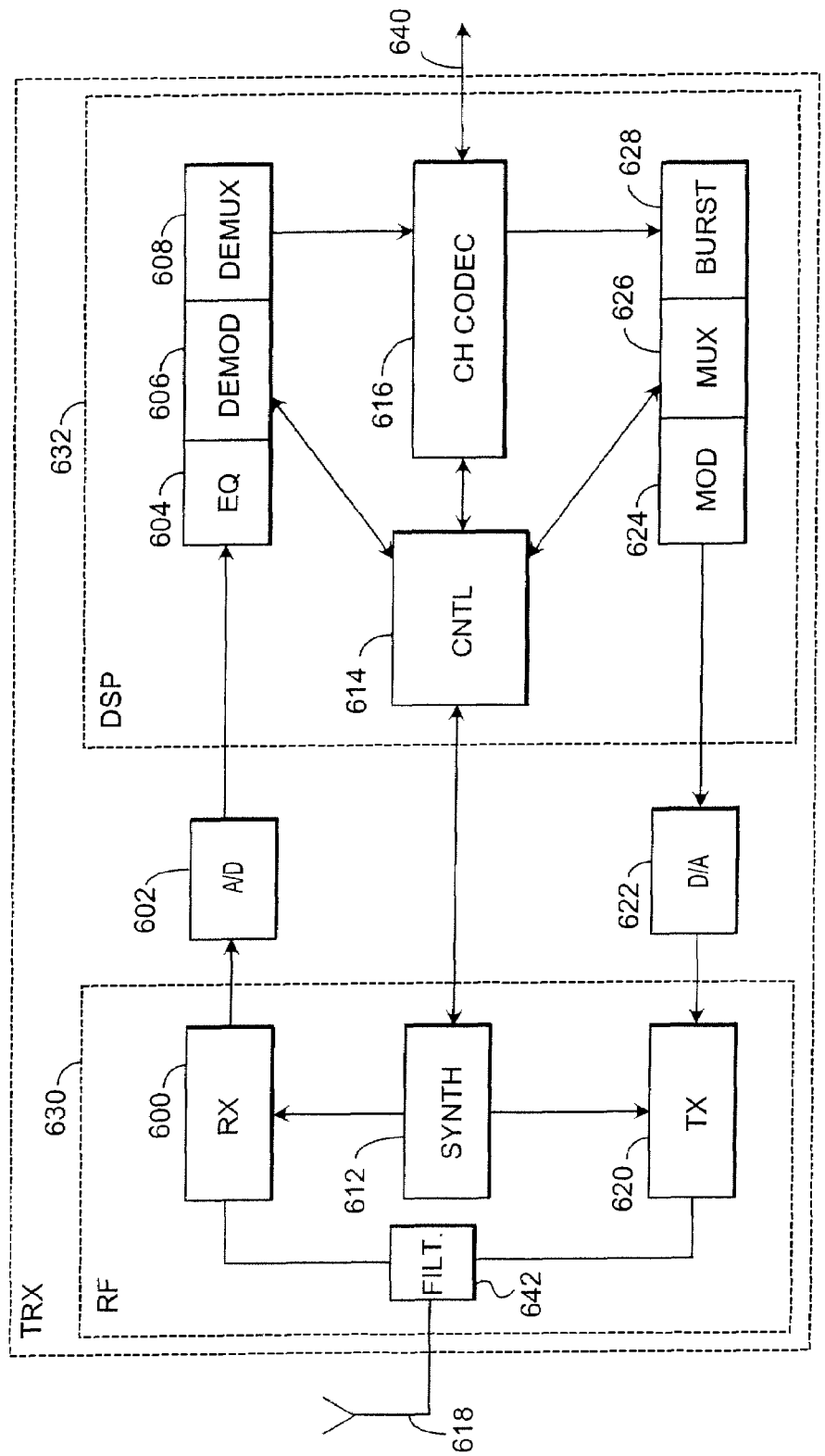

The invention is now described in closer detail in connection with the preferred embodiments and with reference to the accompanying drawings, in which FIG. 1 illustrates an above-described example according to the prior art, FIG. 2 illustrates the structure of an exemplary telecommunication system, FIG. 3 illustrates the structure of the exemplary telecommunication system in closer detail, FIG. 4 illustrates an example of a solution, FIG. 5 is a flow diagram illustrating a solution according to a preferred embodiment of the invention, FIG. 6 illustrates the structure of a device suitable for use in an arrangement of the invention.

DETAILED DESCRIPTION OF PREFERRED EMBODIMENTS

The present invention can be used in different radio systems wherein terminals have different radio path functions. It is, as such, irrelevant which multiple access method a system uses. For instance, CDMA, WCDMA and TDMA are possible multiple access methods. Furthermore, the system can support both circuit-switched and packet-switched connections.

Referring to FIG. 2, the structure of a UMTS mobile telephone system will be described by way of example. The main parts of the mobile telephone system are a core network CN, a UMTS terrestrial radio access network UTRAN and user equipment UE. The interface between the core network CN and the radio access network UTRAN is called Iu, and the air interface between the UTRAN and the UE is called Uu.

The user equipment UE consists of two parts: Mobile equipment ME, which comprises a radio terminal used for establishing a radio connection over the Uu. A UMTS subscriber identity module USIM is a smart card which contains information on the identity of a subscriber and which typically performs identification algorithms, stores encryption parameters and subscriber information.

The UTRAN comprises radio network subsystems RNS. An RNS comprises a radio network controller RNC and one or more nodes B. In practice, node B refers to a base transceiver station. The radio network controller RNC manages radio resources at base transceiver stations connected thereto.

The core network CN consists of several parts. A home location register HLR is a database in a subscriber's home system which maintains a user service profile. The home location register also maintains information on the location of the subscriber at an accuracy of an MSC. A mobile services switching centre/visitor location register MSC/VLR is a switch MSC and a database VLR, which serves the user equipment as far as circuit switched CS services are concerned. The MSC switches the circuit-switched services and the VLR maintains information on the user profile and location. A gateway MSC GMSC, in turn, is a switch connecting the UMTS to external services or networks. All circuit-switched connections pass through the GMSC. The functionality of a part called a servicing GPRS (General Packet Radio Service) support node SGSN is similar to that of the MSC/VLR except that the connections that pass through the SGSN are packet-switched PS ones. Similarly, a gateway GPRS support node GGSN is functionally similar to the GMSC as far as packet-switched connections are concerned. External networks can be divided into two types: circuit-switched networks, e.g. existing telephone networks, and packet-switched networks, such as the Internet.

The UMTS comprises a plurality of specified interfaces. The interface between the smart card USIM and the mobile equipment ME is called Cu. The radio interface between the user equipment and the base transceiver station is called Uu. The interface between the core network CN and the radio access network UTRAN is called Iu. The interface between the radio network subsystems RNS is called Iur. This enables soft handovers between radio network controllers from different manufacturers. The interface between the radio network controller RNC and the base transceiver station B is called Iub.

FIG. 2 shows a rather general description, so it will be clarified by a more detailed example of a cellular radio system in FIG. 3. FIG. 3 only comprises the most relevant blocks but it is obvious to one skilled in the art that a conventional cellular radio network also comprises other functions and structures, which need not be described in closer detail herein. It is also to be noted that FIG. 3 only shows an exemplary structure. In the systems according to the invention, details may differ from those shown in FIG. 3; these differences are, however, irrelevant to the invention.

A cellular radio network thus typically comprises a fixed network infrastructure, i.e. a network part 300, and user equipment 302, which can be fixedly located, placed in a vehicle, or portable user equipment to be carried around. The network part 300 comprises base transceiver stations 304. A base transceiver station corresponds to node B in the previous figure. A radio network controller 306, in turn, controls in a centralized manner a plurality of base transceiver stations 304 connected thereto. A base transceiver station 304 is provided with transceivers 308 and a multiplexer unit 312.

The base transceiver station 304 is further provided with a control unit 310 to control the operation of the transceivers 308 and the multiplexer 312. The multiplexer is used for mapping the traffic and control channels used by several transceivers 308 in a single transmission connection 314. The transmission connection 314 constitutes the Iub interface.

The transceivers 308 of the base transceiver station 304 are connected to an antenna unit 318 for implementing a bidirectional radio connection 316 to the user equipment 302. The structure of frames transmitted on the bidirectional radio connection 316 is specified system-specifically, and it is called air interface Uu. In the preferred embodiments of the invention, at least part of a signal is transmitted using three or more transmitting antennas or three or more beams obtained by means of a plurality of transmitting antennas.

The radio network controller 306 comprises a group switching field 320 and a control unit 322. The group switching field 320 is used for switching speech and data and for combining signalling circuits. The radio network subsystem 322 comprising the base transceiver station 304 and the radio network controller 306 further comprises a transcoder 324. The transcoder 324 is usually located as close to a mobile services switching centre 328 as possible since speech can thus be transmitted in a cellular radio network mode between the transcoder 324 and the radio network controller 306 using as little transmission capacity as possible.

The transcoder 324 converts the different digital speech encoding modes used between a public switched telephone network and a radio telephone network into compatible ones, e.g. from the fixed network mode into another mode of the cellular radio network, and vice versa. The control unit 322 performs call control, mobility management, collection of statistical data and signalling.

As can be seen from FIG. 3, the group switching field 320 can be used for carrying out switching procedures both to the public switched telephone network PSTN 336 through the mobile services switching centre 328 and to a packet transmission network 342.

The connection between the packet transmission network 342 and the group switching field 320 is created by a serving GPRS support node SGSN 340. The support node 340 is responsible for transmitting packets between the base transceiver system and a gateway GPRS support node GGSN 344, and for keeping a record of the location of the user equipment 302 in its area.

The gateway node 344 connects a public packet transmission network 346 and the packet transmission network 342. An Internet protocol or X.25 protocol can be used at the interface. By encapsulation, the gateway node 344 hides the internal structure of the packet transmission network 342 from the public packet transmission network 346, so the packet transmission network 342 looks like a subnetwork to the public packet transmission network 346, the public packet transmission network being able to direct packets to and receive packets from the user equipment 302 in the subnetwork.

The packet transmission network 342 is typically a private network which uses an Internet protocol and conveys signalling and tunnelled user data. Below the Internet protocol layer, the structure of the network 342 may vary operator-specifically both in its architecture and protocols.

The public packet transmission network 346 may be e.g. the global Internet.

Typically, time slots free from circuit-switched transmission are used for packet transmission on an air interface 316. The capacity for packet transmission is reserved dynamically, i.e. when a data transmission request is received, any free channel can be allocated for the packet transmission. The arrangement is flexible, which means that the circuit-switched connections have priority over the packet transmission connections. If necessary, circuit-switched transmission cancels out packet-switched transmission, i.e. a time slot being used by packet transmission is assigned to circuit-switched transmission. This is possible because packet transmission has a high tolerance for such interruptions: transmission simply continues using another time slot allocated for use. The arrangement can also be implemented such that circuit-switched transmission is not given any absolute priority but both the circuit-switched and packet-switched transmission requests will be served in order of arrival. These arrangements are, however, irrelevant to the present invention.

By means of FIGS. 4 and 5, examine next an example of an arrangement according to a preferred embodiment of the invention, using the CORBA architecture as an example. FIG. 4 shows a wireless device 400 running a software application 402. FIG. 5 is a flow diagram illustrating the method. The application 402 of FIG. 4 provides a service, which means that it has to be registered in a name server 412 of the arrangement which maintains a list of services provided by the applications and their addresses. The device comprises a service provider application called ORB (Object Request Broker) 404, which processes the messages and method calls of different applications. Applications use method calls to retrieve services. In step 500, the application 402 transmits a registration message to the service provider application 404. The service provider application 404 adds information on the address of the application to the registration message so as to enable the address to be stored in the name server in step 502. The address comprises information on the address of the device and the address of the memory space of the application in the memory of the device. Since the device in this example is a wireless one not knowing its own address, e.g. its own MSISDN number, that would enable the device to be accessed, the service provider application replaces the address of the device with a predetermined symbol sequence, i.e. a "self address tag", in the message. In step 504, the service provider application indicates and transmits the message to a CORBA name server 412, in which the service provider applications are registered.

In a solution of the preferred embodiments of the invention, the message from the service provider is transmitted to an adapter 420, using a separate WIOP (Wireless Inter-ORB Protocol) protocol adjusted to a wireless connection. The adapter adapts the protocol used over the wireless section of the connection to the rest of the network.

Comparing FIGS. 3 and 4, it can be stated that in some preferred embodiments of the invention, the adapter is located in the block designating the packet transmission network 346. This is the case particularly if the connection to the adapter is carried out through a GPRS network. If, on the other hand, the connection to the adapter is established through e.g. a modem, the adapter can also be located in the telephone network, in block 336. The location of the adapter per se is irrelevant to the invention; the relevant point is that the connection between the adapter and the terminal comprises a wireless section, i.e. the transmission path 316 in the example of FIG. 3.

Let us return to FIGS. 4 and 5. In step 506, the adapter detects that in the message, the address of the device has been replaced by the self address tag. The adapter then determines the address of the transmitting device in step 508. This can be carried out in different ways, depending on the system and the transmission method of the message.

If, for example, the message is transmitted as a short message, e.g. using the SMS service of the GSM system, the GSM system short message centre has then added the MSISDN address of the transmitter to the message. The adapter 420 thus finds out the address in this manner.

If the message is transmitted through a GPRS packet network, the GPRS network then adds the IP address used by the transmitter to the message, which can be used as the address.

If, in turn, the message is transmitted through a modem, the modem then communicates with a RADIUS (Remote Authentication Dial In User Service Protocol, RFC 2138) system for authentication, the system providing each connection with an IP address. The adapter then finds out the MSISDN number of the device from the RADIUS system.

In an embodiment, the address of the device is an IP connection address and/or port number provided by an NAT (Network Address Translation) server. NAT servers are commonly used in connection with Internet traffic, and they convert internal company network addresses into public ones.

The methods described above are only examples. After the adapter 420 has found out the address of the device that transmitted the message, the adapter 420, in step 510, replaces the self address tag with the address of the device, and forwards 512 the message to the name server 412. The name server registers the provided service and application and their addresses in the memory. Now another application in some other device 406 is able to access the name server through its own service provider and retrieve the address of the application that provided the service. The connection to the device 400 providing the service takes place through the adapter 420. The connection between the adapter 420 and the device 406 can be e.g. an Internet connection, in which case the GIOP is implemented using the IIOP protocol.

The adapter can be implemented by a computer or a processor and software.

The software applications as such are not aware of the location of the servers but they see the rest of the environment only through method calls. The service providers and software can be implemented in different programming languages and in different hardware solutions. The parties to data transmission are verified according to the CORBA architecture in connection with the data transmission.

FIG. 6 illustrates a structure of a device in a wireless system whereto the solution of the preferred embodiments of the invention can be applied. The device comprises an antenna 618 for transmitting and receiving signals. From the antenna, a signal is supplied to a duplex filter, which separates the transmit and receive direction signals from each other. A receiver 600 comprises a filter to block frequencies outside a desired frequency band. Next, the signal is converted into intermediate frequency or directly to base frequency, and the signal thus converted is sampled and quantized in an analogue/digital converter 602. An equalizer 604 compensates for interference, e.g. interference caused by multipath propagation. A demodulator 606 takes a bit stream from the equalized signal and delivers it to a demultiplexer 608. The demultiplexer 608 separates the bit stream from different time slots into separate logical channels. A channel codec 616 decodes the bit stream of the different logical channels, i.e. decides whether the bit stream is signalling information to be transmitted to a control unit 614 or whether the bit stream is speech to be forwarded 640 e.g. to a speech decoder. The channel codes 616 also performs error correction. The control unit 614 performs internal control tasks by controlling different units. A burst generator 628 adds a training sequence and tail bits to the data supplied from the channel codec 616. A multiplexer 626 assigns a particular time slot to each burst. A modulator 624 modulates digital signals to a radio frequency carrier wave. This function is analogue by nature, requiring a digital/analogue converter 622. A transmitter 620 comprises a filter to restrict the bandwidth. The transmitter 620 further controls the transmission output power. A synthesizer 612 arranges the necessary frequencies for the different units. A clock in the synthesizer 612 can be controlled locally. The synthesizer 612 provides the necessary frequencies using e.g. a voltage-controlled oscillator.

As shown in FIG. 6, the structure of a transceiver can be further divided into radio frequency parts 630 and digital signal processing processor with its software 632. The radio frequency parts 630 comprise the receiver 600, transmitter 620 and synthesizer 612. The digital signal processing processor with its software 632 comprises the equalizer 604, demodulator 606, demultiplexer 608, channel codec 616, control unit 614, burst generator 628, multiplexer 626 and modulator 624. The conversion of an analogue radio signal into a digital one necessitates the analogue/digital converter 602 and, similarly, the conversion of a digital signal into an analogue one necessitates the digital/analogue converter 622.

The device may further comprise user interface parts, such as a display, keypad, earpiece and a microphone. However, these are not shown in the figure. The control unit 614 of the device is typically implemented by a microprocessor or separate logic circuits including their memory elements and necessary software. The control unit is capable of executing software requiring or providing different services, as described above. The control unit is also capable of executing the software required by the service provider and the appropriate functions.

The device in accordance with the preferred embodiments of the invention may also be a combination of the terminal equipment described above and a portable computer connected thereto. In such a case, software requiring or providing different services is run in the computer and the terminal equipment is used for establishing a wireless telecommunication connection. The service provider application can be implemented either in the terminal equipment or the computer. It is also feasible that both the terminal equipment and the computer are provided with communicating applications.

Although the invention has been described above with reference to the examples according to the accompanying drawings, it is obvious that the invention is not restricted thereto but can be modified in many ways within the scope of the inventive idea disclosed in the attached claims.

The invention claimed is:

1. A method for implementing data transmission between applications run at least in two different devices, the method establishing a connection between the at least two devices via a data transmission system, the method comprising:
   implementing, by a wireless connection, at least a wireless section of a connection between the at least two devices running the applications,
   transmitting method call messages and reply messages to method call messages to establish a communication between the at least two devices running the applications, each of the method call messages comprising a service request, and
   including in at least some of the method call messages an address of an application in one of the devices that transmitted a method call message,
   wherein the transmitting of an individual one of the method call messages is accomplished by a device behind the wireless connection for providing the method call message with the address of the application and providing the address with a predetermined symbol pattern, and
   the method further comprises a transmitting of the method call message to an adapter, and an adapting, by the adapter, of a protocol used over the wireless section of the connection to the rest of the network, and which replaces the symbol pattern with the address of the device that transmitted the method call message.

2. The method of claim 1, further comprising a receiving, by the adapter, of the message containing the predetermined symbol pattern, a finding out, from a telecommunication system, the address information on the device that transmitted the message, and a replacing of the symbol pattern with the address information found out.

3. The method of claim 1, further comprising a transmission, by the device located behind the wireless connection running the application, of a message comprising information on a service provided by the application.

4. The method of claim 3, further comprising a transmitting of the message to a name server, which maintains a list of software items providing different services.

5. The method of claim 1, further comprising a transmitting, by the device located behind the wireless connection and running the application, of the message as a text message, and the adapter finds out the address information on the device from a text message centre.

6. The method of claim 1, further comprising a transmission, by the device located behind the wireless connection and running the application, of a message as a GPRS call, and the adapter finds out the address information on the device from a GPRS system.

7. The method of claim 1, wherein the including in a call message of the address of the application in one of the devices that transmitted the message comprises inclusion of information on the address of the device and the address of a memory space of the application in a memory of the device.

8. The method of claim 7, further comprising a replacing of the predetermined symbol pattern with the information on the address of the device.

9. The method of claim 1, wherein the address of the device is its MSISDN number.

10. The method of claim 1, wherein the address of the device is an Internet address and/or port number provided by an NAT server.

11. The method of claim 1, wherein, in the transmitting of the method call message by a device located behind the wireless connection and running an application, there is a transmitting of a message to a service provider application of the wireless device, which, in the message, replaces the address of the device with the predetermined symbol pattern, and transmits the message to the adapter, which replaces the symbol pattern with the address of the device.

12. The method of claim 1, further comprising a determining, by the adapter, based on protocols of the method call messages, of the address of the device that transmitted the method call message.

13. An arrangement for implementing data transmission between at least two devices via a data transmission system, the arrangement comprising:
a wireless connection in at least one of the devices for establishing a wireless connection to the data transmission system, the wireless connection providing at least a wireless section of a connection between at least two of the different devices,
the arrangement is operative for establishing a communication between the at least two devices by transmission of method call messages and reply messages to method call messages, each of the method call messages comprising a service request, and at least some of the method call messages comprising an address of an application of one of the devices that transmitted a method call message,
a device behind the wireless connection is adapted for transmitting an individual one of the method call messages containing the address of the application and providing the address of the application with a predetermined symbol pattern, and
an adapter which is connected to wireless devices and which adapts a protocol used over the wireless section of the connection to the rest of the network, the adapter replacing the symbol pattern with the address of the device that transmitted the method call message.

14. The arrangement of claim 13, wherein the adapter is arranged to receive the message containing the predetermined symbol pattern, find out, from a telecommunication system, the address information on the device that transmitted the message, and to replace the symbol pattern with the address information found out.

15. The arrangement of claim 14, further comprising a name server arranged to maintain a list of software items providing different services.

16. The arrangement of claim 13, wherein the device behind the wireless connection is operative for transmitting a message comprising information on a service provided by the application run in the device.

17. The arrangement of claim 13, wherein the device behind the wireless connection has one or more applications generating messages, and a service provider application arranged to replace, in the messages, the address of the device with a known symbol pattern.

18. The arrangement of claim 17, wherein the device is terminal equipment in a cellular radio system.

19. The arrangement of claim 17, wherein the device is a combination of terminal equipment and a computer in a cellular radio system.

20. The arrangement of claim 13, wherein the adapter determines, based on protocols of the method call messages, the address of the device that transmitted the method call message.

* * * * *